(No Model.)
W. M. STEWART.
NUT LOCK.
No. 505,140.      Patented Sept. 19, 1893.
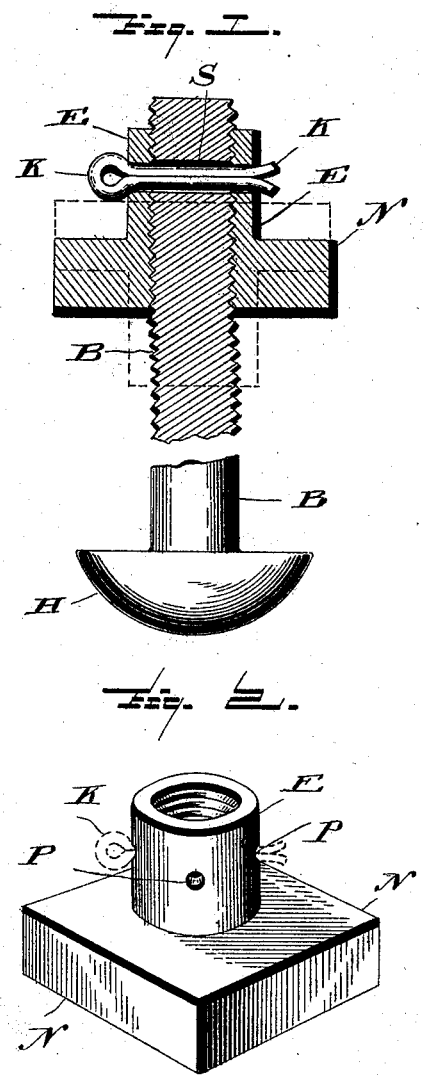
Witnesses:
L. C. Hills
J. H. Jochum Jr.
Inventor:
William M. Stewart,
by Collamer & Co,
Attorneys.

UNITED STATES PATENT OFFICE.

WILLIAM MILLS STEWART, OF SCURRY, TEXAS.

NUT-LOCK.

SPECIFICATION forming part of Letters Patent No. 505,140, dated September 19, 1893.

Application filed July 21, 1892. Serial No. 440,852. (No model.)

*To all whom it may concern:*

Be it known that I, WILLIAM MILLS STEWART, a citizen of the United States, residing at Scurry, Kaufman county, Texas, have invented a new and useful Improvement in Nuts and Nut-Locks, of which the following is a specification.

This invention relates to nuts, such as are adapted to be screwed onto a bolt, threaded shaft, axle spindle, or other screw; and the object of the same is to provide an improved construction of nut together with a lock for holding the same on the bolt.

To this end the invention consists of a nut of the construction hereinafter described, together with the improved nut lock therefor also described below—all as illustrated in the accompanying sheet of drawings, wherein—

Figure 1 is a central longitudinal section of a bolt, a nut of my improved construction screwed thereon, and a split pin key locking these parts together; the nut being shown in full lines in its preferred position, and in dotted lines in the position which it may sometimes assume as described below. Fig. 2 is a perspective detail of the nut alone.

Referring to the accompanying drawings, the letter B designates a screw, threaded shaft, carriage axle, or ordinary bolt having at one end a head H and having formed transversely through its body near its threaded end a slot S closed at both ends, *i. e.*, not open through the end of the bolt.

Coming now to the present invention, the letter N designates a nut which may be polygonal or square (preferably the latter), and from one side of this nut I project an integral, tubular, axial extension E of some considerable length. The interior of the nut and extension is threaded for the entire length thereof, while the exterior of the extension is truly cylindrical and is of a diameter much smaller than any diameter of the nut. The end of this extension opposite the nut is flat so as to lie in a plane with the remotest face of the nut; and through this extension near its flat end, *i. e.*, remote from the adjacent face of the nut and parallel with said face are formed two perforations P at right angles to each other and preferably coincident with the longest diameters of the square nut N as shown.

K is a key—preferably of the split pin type—which key may be passed through either of these perforations and through the slot S in the bolt when aligned therewith, and the entire length of the key is much less than the shortest diameter of the nut but longer than the diameter of the extension.

In operation, the nut is screwed onto the bolt (or other threaded member) as shown in full lines in Fig. 1, or it may be inverted and screwed thereon as shown in dotted lines in this figure. The full-lined position indicates the preferred use of my improved nut and brings into play to the best advantage the nut lock. The nut is screwed down until one of the perforations P is in alignment with the slot S, when the key K is passed therethrough as indicated. If the nut now stands in a cavity in the member beneath it, it will be obvious that the key can be inserted and withdrawn no matter how deep the cavity, because the latter must have at least sufficient diameter to permit the nut to rotate, which diameter would therefore necessarily be larger than the longest diameter of the nut. If the perforations stand parallel with said longest diameter, it is obvious that the key may be withdrawn with ease. This key is preferably of wire or other pliable material. In the use of this nut in its dotted position as here shown, it will be obvious that the tubular extension may stand against the adjacent member clamped beneath it by interposing a washer, or by omitting the washer if the member be of metal or other hard material; and the key may be passed through the slot above the nut if desired. Or, if the member have a deep cavity too small to receive the nut, it will be obvious that the tubular extension might be forced down into this cavity by turning the nut with any suitable tool. In either such instance, the flattened end of the extension serves to bear firmly and strongly against said member. The exterior of this extension is made truly cylindrical in order that a member may be pivotally mounted on said extension—a mechanical construction which is often desirable. Hitherto such pivotal mounting of a member was had directly upon the body of the bolt under the nut, when a nut lock became desirable and often a necessity, because the turning of the member would loosen the nut. But the most decided advantage gained by this construction is that by the use of my improved nut I permit one member to be tightly clamped and another member to be pivoted, which was not the case hitherto because when one member was loose both had to be. In this use of my device, either the body of the nut or the end of the extension is screwed tightly against the member to be clamped, and afterward the member to be pivoted is bored with a hole of a size to encircle the extension and is passed thereover either side up since the hole is cylindrical to conform with the exterior shape of the extension. If the nut at this time stands in its full lined position as shown in Fig. 1, the nut lock may be employed as there shown provided the pivoted member is thin enough to encircle the extension between the key and the nut; or, if it is thicker, it will be obvious that the nut must be screwed farther down the bolt and the key passed through the slot S above the end of the extension, in which position it will hold the pivoted member of the extension since the key is longer than the diameter of said extension. If the pivoted member is mounted on the extension when the parts stand as shown in dotted lines, the nut lock can only be employed by passing the key through the slot S above the nut—interposing washers, if necessary to move the nut farther down on the bolt. Hence it will be seen that the pivoted member could stand at either side of the nut proper, and that the nut lock could be used therewith if the pivoted member were sufficiently thin.

Having thus described my invention, what I claim as new is—

The combination with a bolt having through its threads a slot closed at both ends; of a nut having at one side a reduced tubular axial extension whose entire length is exteriorly cylindrical and interiorly threaded, the end of the extension opposite said nut being flat and its body provided with diametric perforations some distance from the nut, and a key of greater length than the diameter of the extension but of less length than any diameter of the nut, said key removably engaging said slot in the bolt at either end of the nut or removably engaging both the slot and one perforation, as and for the purpose set forth.

WILLIAM MILLS STEWART.

Witnesses:
J. F. VAN HORN,
M. C. LACEY.